(12) United States Patent
Thomson (10) Patent No.: US 12,044,260 B2
(45) Date of Patent: Jul. 23, 2024

(54) JOINT PIECES AND RECTANGULAR JOINT STRUCTURES

(71) Applicant: INTELLIGENT FIXINGS LIMITED, London (GB)

(72) Inventor: Luke Thomson, London (GB)

(73) Assignee: INTELLIGENT FIXINGS LIMITED, London (GB)

( * ) Notice: Subject to any disclaimer, the term of this patent is extended or adjusted under 35 U.S.C. 154(b) by 365 days.

(21) Appl. No.: 16/969,527

(22) PCT Filed: Feb. 14, 2019

(86) PCT No.: PCT/EP2019/053746
§ 371 (c)(1),
(2) Date: Aug. 12, 2020

(87) PCT Pub. No.: WO2019/158667
PCT Pub. Date: Aug. 22, 2019

(65) Prior Publication Data
US 2021/0003159 A1     Jan. 7, 2021

(30) Foreign Application Priority Data

Feb. 14, 2018 (GB) ...................................... 1802384
Jun. 25, 2018 (GB) ...................................... 1810364

(51) Int. Cl.
    *F16B 12/12*         (2006.01)
    *F16B 12/22*         (2006.01)

(52) U.S. Cl.
CPC ............ *F16B 12/125* (2013.01); *F16B 12/22* (2013.01); *A47B 2230/0077* (2013.01); *A47B 2230/0081* (2013.01)

(58) Field of Classification Search
CPC ...... F16B 5/002; F16B 5/0036; F16B 5/0044; F16B 5/0084; F16B 12/12; F16B 12/22;
(Continued)

(56) References Cited

U.S. PATENT DOCUMENTS 3,645,162 A * 2/1972 Welch ................... F16B 21/09
                                        52/285.3
4,353,663 A * 10/1982 Glickman .............. F16B 12/20
                                        403/231
(Continued)

FOREIGN PATENT DOCUMENTS

CN           1138891 A     12/1996
CN        202269630 U      6/2012
(Continued)

OTHER PUBLICATIONS

International Search Report in corresponding PCT application No. PCT/EP2019/053746, Apr. 5, 2019, 4 pp.
(Continued)

*Primary Examiner* — Michael P Ferguson
*Assistant Examiner* — Zachary A Hall
(74) *Attorney, Agent, or Firm* — Tredecim LLC; Sean L. Sweeney (57) ABSTRACT

A joint piece and jointing system using that joint piece are described. The invention is of particular value in making furniture which can be easily assembled and where the joints formed by joint pieces are visible only on the exterior of right-angled corners on one side of the exterior corner. Each joint piece (7) consists of a base having a protruding collar with a head. The base is circular or polygonal and fits into a recess made on one side of one of the panels (5) to be joined. Once fitted, the protruding collar and head fit into keyhole-shaped slots formed on the adjacent panel (6). An advantage of this jointing system is that the panels (5, 6) to be joined may all be produced by CNC milling from one side of a large original sheet of material, e.g. of wood or high density fibreboard.

10 Claims, 12 Drawing Sheets

(58) Field of Classification Search
CPC .......... F16B 12/24; F16B 12/26; F16B 12/34; F16B 12/36; F16B 12/38; F16B 2200/30; Y10S 403/10; Y10S 403/11; Y10S 403/13; A47B 2230/0077; A47B 2230/0081
See application file for complete search history.

(56) References Cited

U.S. PATENT DOCUMENTS

| | | | | |
|---|---|---|---|---|
| 4,587,788 | A | * | 5/1986 | Bielicki ................ F16B 5/0036 403/353 |
| 5,468,109 | A | * | 11/1995 | Ferrari ................... F16B 12/20 411/549 |
| 5,676,487 | A | * | 10/1997 | Lautenschlager ... F16B 12/2036 403/231 |
| 2011/0260592 | A1 | | 10/2011 | Lin |
| 2014/0255093 | A1 | | 9/2014 | Yang |
| 2016/0108945 | A1 | | 4/2016 | Yang |
| 2023/0095148 | A1 | * | 3/2023 | Fornell ................... F16B 12/14 5/93.1 |

FOREIGN PATENT DOCUMENTS

| | | | | |
|---|---|---|---|---|
| DE | 1966962 A1 | * | 1/1976 | .............. F16B 12/24 |
| DE | 102005053321 | | 5/2007 | |
| EP | 1798424 | | 6/2007 | |
| GB | 1398439 A | * | 6/1975 | .............. F16B 12/24 |
| GB | 2305226 | | 4/1997 | |
| GB | 2496613 | | 5/2013 | |
| WO | WO-2015015857 A1 | * | 2/2015 | .............. F16B 12/26 |

OTHER PUBLICATIONS

Written Opinion in corresponding PCT application No. PCT/EP2019/053746, Apr. 5, 2019, 6 pp.
Best available translation of DE102005053321, May 10, 2007, to Alno AG, 9 pp. (translation via Patent Translate Powered by EPO and Google).
English Abstract of CN202269630, 1 pp.
English Abstract of CN1138891 (from corresponding document: GB2305226), 2 pp.
Examination Report in corresponding CN application No. 201980013681.6, Nov. 29, 2021, 9 pp.
English summary of Examination Report in corresponding CN application No. 201980013681.6, 3 pp.
Examination Report in corresponding EPO application No. 19707719.1, Apr. 5, 2022, 2 pp.

* cited by examiner

SECTION H-H
Fig. 6E

SECTION A-A
Fig. 7C

SECTION A-A
Fig.10 D

JOINT PIECES AND RECTANGULAR JOINT STRUCTURES

This invention relates to joint pieces and to joints between two panels of material to be fixed at right angles to one another.

The present invention is of particular applicability in connection with the manufacture of furniture structures, such as storage boxes, bookcases and kitchen cabinets, but the joint piece which forms the subject of this invention may be used in a wide variety of analogous applications where it is desired to fix two panels together, one lying in a plane perpendicular to the other.

There are numerous instances where it is desired to construct something having two panels running perpendicular to one another. A common way of achieving this, particularly for a butt joint, where an edge of one panel is to be located adjacent the face of another panel and fixed thereto, is to provide an elongate fixing, such as a screw or nail which passes perpendicularly through one panel in a direction perpendicular to the plane of the panel itself and which then enters into the edge of the other panel in a direction parallel to the plane of that other panel. A problem with such screw or pin connections is that they do not lend themselves to easy disassembly, as well as the difficulty of rendering the position of the head of the screw or nail invisible.

Published specifications WO 2013/104422 and WO 2016/137385 disclose a variety of joint fixings between furniture components where joint pieces are provided in the form of protruding ribbed dowel members which may be fitted to one furniture component and which have a projecting portion which may be inserted into a cavity in a separate furniture component, the cavity being in the form of a slot with a wider end enabling the ribbed dowel member to be inserted fully into the slot and having a narrower end with an internal ribbed configuration which matches the configuration on the ribbed dowel member. Furniture items may be assembled in this way where one panel has the slot form cavities in it and the other panel has the ribbed dowels projecting from its end.

Published specifications WO 2017/015402 and WO 2017/015403 disclose barbed double dowel members which are push fitted into preformed holes bored into a furniture panel. Alternatively, elongate fixings may be pushed into slots and then slid in the slots to lock them in an undercut section of the slot.

DE102005053321 discloses a system for fixing components of furniture together where the fixing is not visible after the furniture has been assembled. The fixing described in that specification consists of two components:

A first component consists of a shaft for press fit insertion into a hole bored into the edge of a first panel and, on the end of the shaft, a frusto-conical head, the narrower end of which abuts the shaft and the wider end of which may be inserted into the second component. The second component consists of a disc which is a press fit in a cylindrical recess in the face of a second panel, and which has an elongate recess in one of its circular faces, one end of the recess being wide enough to receive the wider end of the frusto-conical head on the shaft of the first component and the other end of the recess being narrower on the face of the disc and undercut to enable the frusto-conical head to be held captive in the disc when slid along the slot. With such a system, a panel having two first components set in its edge, frusto-conical heads protruding, may be joined at right angles to a second panel having a pair of such discs set in its face spaced identically to the two first components and with the two elongate slots in the two discs aligned with one another or parallel to one another. The frusto-conical projecting portions are pushed into the two slots whereafter one panel is moved relative to the other to cause the heads on the two first components to be trapped in the undercut parts of the slots in the two second components. Such a joint may be disassembled by reversing the movement, in a fashion similar to that disclosed in the earlier published specifications noted above.

A separate approach commonly adopted in the construction of "flat pack" furniture is to provide holes drilled in a first panel which then register with holes drilled in the edge of a second panel to which the first is to be fixed. It is known to provide, at the end of the second panel and spaced away from the panel edge, a cylindrical recess of depth sufficient that the hole drilled from the side of the panel is located in the cylindrical wall of the recess between its circular ends, and to use, in place of a screw or nail, a headed bolt. This may have a screw-threaded shaft adapted to be screwed into a transverse-threaded bore in a cylindrical fixing piece which is located within the cylindrical recess extending from one side of the panel, or the end of the headed bolt which protrudes into the recess has a head connected to the remainder of the bolt by a narrower collar. This head may be engaged by a cylindrical fixing having an internal camming surface and a slot enabling the head of the bolt to be located between the two circular sides of the cylindrical insert. On turning the cylindrical insert, the surfaces of the head of the bolt adjacent the neck are engaged by the camming surface and the bolt drawn in towards the centre of the cylindrical cut-out, so pulling the two panels tightly together.

Such fixtures can be loosened in order to disassemble the connection between the two panels.

If it is desired that the exterior surfaces of the panels, i.e. the surfaces opposite the interior 90° angle of the corner are both uninterrupted, then the bolts may be screwed into blind holes in the first panel before being inserted into the holes in the second panel extending from one edge of that second panel to the respective cylindrical recesses.

Preparing two panels so that they may be connected in the various ways described in the patent specifications referred to above inevitably requires the provision of holes extending perpendicularly to the surface of one panel and extending parallel to the plane of the other panel. For example, to provide a set of panels for assembling into a complete piece of flat packed furniture using camming fixings requires the provision of recesses in one panel for receiving one end of a bolt and recesses in the other for the cylindrical cam fixture engageable with the non-threaded end of the bolt, as well as the provision of a bore through which the bolt passes from the edge of the panel and extending as far as the cylindrical recess. This requires separate forming operations involving moving forming tools, such as a drill or router head, in two different directions, one being parallel to the plane of a panel and the other perpendicular to that plane.

We have now found that by the use of a new design of joint piece, it is possible to manufacture structures consisting of interconnected panels where the formation within the panels of the relevant holes and/or recesses can be carried out exclusively using boring and cutting tools operating from one side of a large panel of material from which the various component panels for assembly to make up the structure, for example a piece of furniture, may be made by cutting the large panel into a number of smaller ones. The tools are moved to effect a cutting operation in a direction perpendicular to the face of the panel in order to make the formations for receipt of the joint piece.

According to a first feature of the present invention, there is provided a joint piece consisting of a circular or polygonal base having a generally cylindrical or prismatic structure and, protruding from one side of the base in a direction perpendicular to the axis of the cylindrical or prismatic structure, a headed stud having a first narrower or neck portion adjacent the base and, at the end of the neck portion remote from the base, a wider head, where the edge of the head is inset from the plane of one side of the base.

Two panels may be joined together using two or more of such joint pieces by providing, extending from the face of one panel, adjacent its edge, a plurality of recesses of a depth at least equal to the distance between the two faces of the base of the joint piece and of shape corresponding to the circular or polygonal shape of that joint piece base, and inserting the joint piece into that recess. This leaves the neck portion and head extending from the edge of the first panel in a direction parallel to the plane of the panel. In the second panel to be joined to the first panel, a plurality of generally keyhole-shaped recesses are made, where the walls defining the narrower end of the keyhole shape are undercut to provide a slot or seat into which the head of the stud forming part of the joint piece can be slid with the collar of the joint piece sliding along the narrower portion of the keyhole-shaped slot.

If the edge of the first panel has two joint pieces of the type described above set appropriately distanced along its edge and the second panel has two keyhole-shaped slots with undercuts and spaced from one another by the same distance as the spacing of the two projecting studs forming part of the joint pieces, the two panels may be assembled together by inserting the heads of the joint pieces into the wider portions of the two keyhole-shaped slots, and then, by sliding one panel relative to the other, the two heads may be caused to move into the undercut portions of the keyhole-shaped recesses in the second panel.

Provided that the dimensions are accurately chosen, this enables a strong joint to be obtained with the joint pieces being visible only at the edge of the panel containing the circular or polygonal recesses.

Provided that the thickness of the two panels is greater than the thickness of the circular or polygonal base of the joint piece on the one hand and the extension of the stud from that base on the other, the joint pieces are only visible on one face of one of the panels once they have been assembled together. The interior faces, forming a 90° corner, do not show any trace of the fixing members and only one of the panels shows that there is a fixing member holding the two panels together and which is visible from the outside.

The joint system in accordance with the invention may be applied to a wide variety of materials and constructional situations, but is of particular value in the manufacture of furniture made from panels of wood or composite fibre-based material. This is because using the joint system in accordance with the present invention, a complete set of panels required to assemble, for example, a modular kitchen cabinet unit may be produced by taking a sheet of the base panel material of substantial size, and then treating that panel by milling, from one side of the panel only, a series of narrow slots (to divide the base panel unit into a set of sub-panels), a set of circular or polygonal recesses (which will be adjacent the edges of certain of the individual panels when the original large sheet of material is cut up into sections), and a plurality of keyhole slots in positions inset from the edges of the panels in which they are made and in positions corresponding to the positions of the circular or polygonal recesses in the other panels. It is thus possible to produce all of the panel components necessary for a piece of furniture without needing any cutting or boring operations in the panel edges, cutting in a direction parallel to the plane of the panel. Conceptually, the joint pieces according to the invention embody the 90° angle at which the two panels connected by the joint pieces are to be set.

The production of a set of panels in this way may be achieved using a computer numerically controlled (CNC) milling machine which can rapidly convert a large sheet of material, for example of composite fibreboard or a composite laminated material, into a set of individual panels ready to be assembled together. The computer-controlled milling machine may also be provided, in addition to the customary milling cutters mounted on movable heads, with means to apply an identification to each of the finally-produced panels to enable assembly to be more securely achieved, including, for example, reference numbers to which the person assembling the item may refer to ensure that the panels are assembled in the correct order.

Provided that the recesses in the panels and the joint pieces are correctly dimensioned, the fitting of the joint pieces into the recesses may be a simple press fit, i.e. the assembly of the joint, and, indeed, of a structure incorporating several joints, may be carried out by hand without needing any tools.

The joint pieces may be made of any suitable material, for example an engineering grade plastics or a suitable metal alloy. The base of the joint piece may have a relief surface on the sides which are to engage the sides of the recess, for example raised barbs or ribs, enabling the joint piece to be press-fitted by pushing into the recess but which can only be extracted from the recess with greater difficulty. The face of the base of the joint piece which is to be adjacent the base of the recess when inserted may be slightly smaller than the exterior plan of the base so as to facilitate it being pushed in straight when inserting the joint piece into the round or polygonal recess.

While the use of a joint system in accordance with the invention as described above enables the simple assembly of two panels at right angles to one another, it is not unusual, for example at the back of a cabinet or set of shelves, to fix a third panel of material running in a plane at right angles to the planes of both first and second panels, and this may be done without compromising the substantial ease of manufacture indicated above (cutting from one side of the large panel only) by providing panel members where the clip members comprise of a circular or polygonal base member having a generally cylindrical or prismatic structure and a clipping arm protruding from one side of the base, the first portion of the arm extending from the base in a direction perpendicular to the axis of the cylindrical or prismatic structure and having a second portion connected thereto extending in a plane parallel to the axis of the cylindrical or prismatic structure.

It is also possible to provide, again formed from one side of the original large sheet of material from which the panels are cut, additional undercut keyhole configurations and to provide studs which may be affixed as desired to other components. Such fixing may be effected by the use of a joint piece according to the present invention, or by the use of double-ended studs which may be inserted into undercut keyhole configurations in a first panel and then a second panel with like undercut keyhole configurations at the spacing matching those in the first panel, may be located over the studs, pushed into contact with the first panel and then slid relative to the first panel to engage the stud heads in the undercut configuration. A typical example where such assembly of two panels is needed is the provision of a drawer front on a rectangular open box-like drawer carcase. The drawer front may be the same size as the side of the carcase, or larger, so as to fit neatly into a furniture carcase having spaces for the receipt of the drawers on the sides of which support rails are mounted to engage with runners on the sides of the box-like drawer carcase.

The invention is illustrated by way of example with reference to the accompanying drawings in which.

Figures 1A, 1C, 1D, 1E, 1F, 1G:
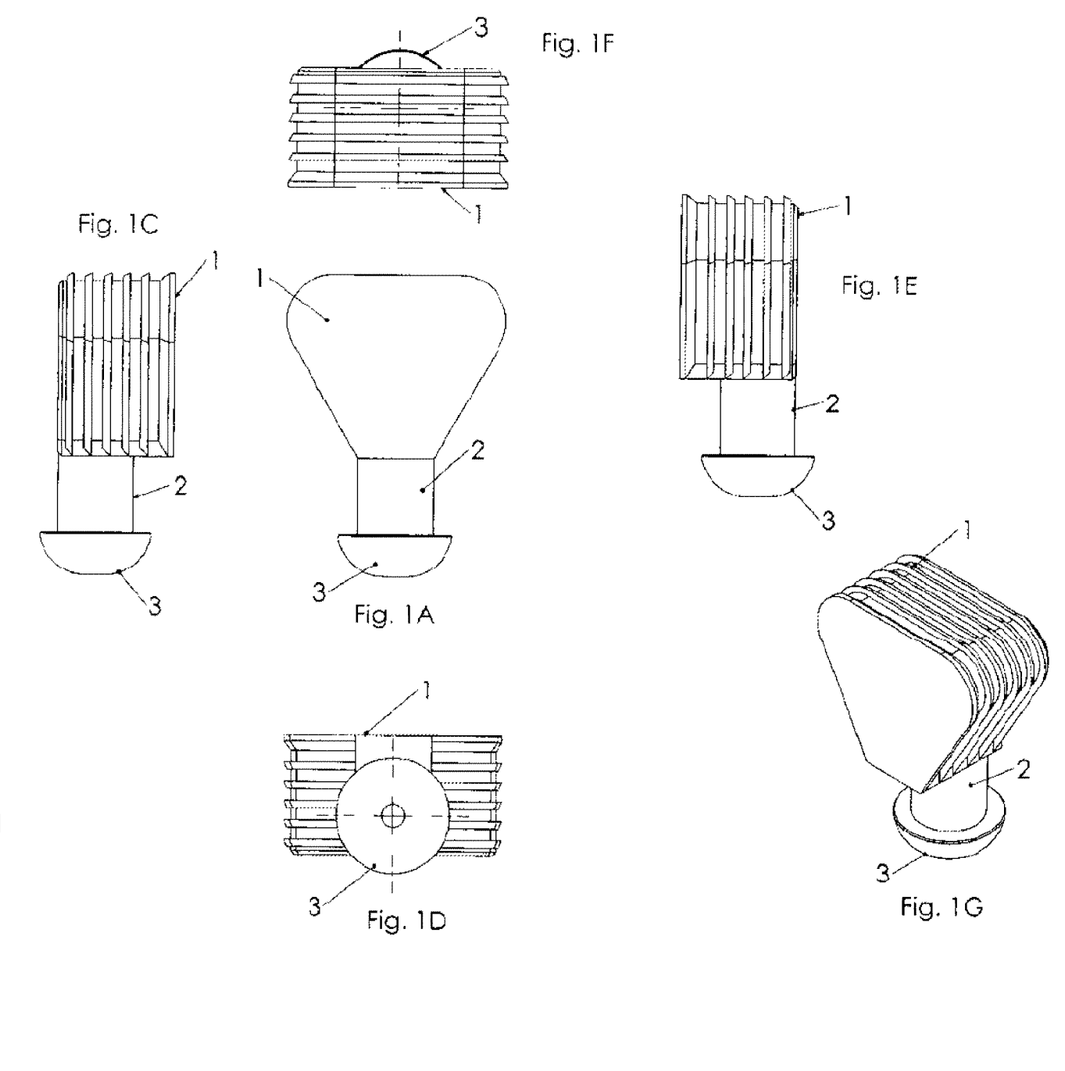
FIG. 1 shows various views identified as sub-FIGS. 1A to 1G of a first embodiment of a joint piece in accordance with the invention.
Figure 1B:
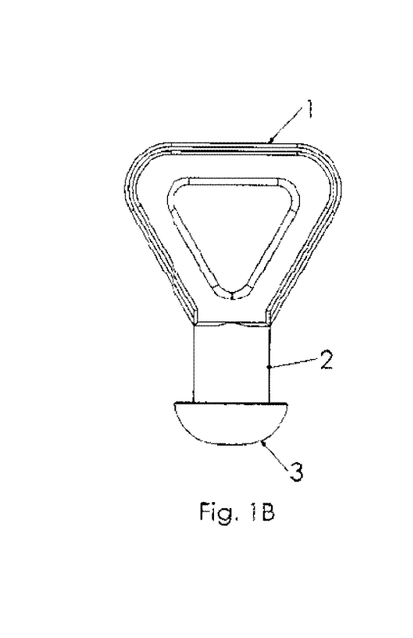
Figures 2A, 2F:
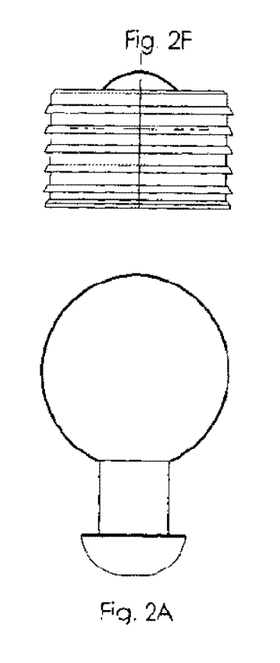
FIG. 2 shows various views identified as sub-FIGS. 2A to 2G of an alternative joint piece in accordance with the invention.
Figure 2B:
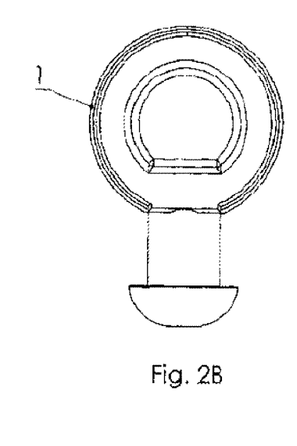
Figure 2C:
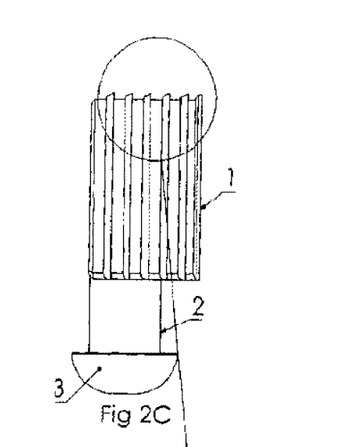
Figure 2D:
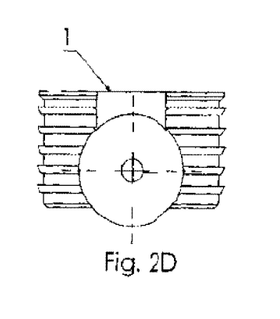
Figure 2E:
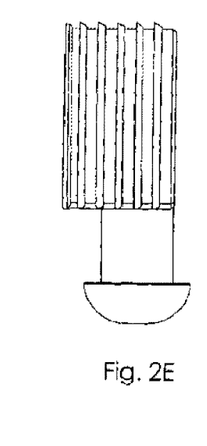
Figure 2G:
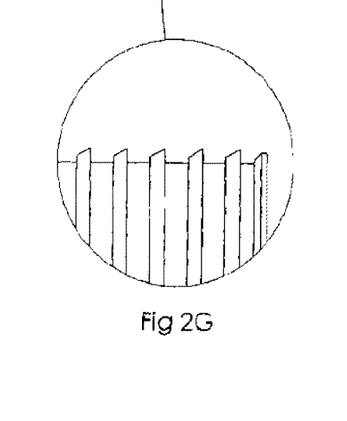

In each of FIGS. 1 and 2, sub-figures A and B show a plan and underneath plan view of the joint piece and sub-figures C, D, E and F show side views of the joint piece from four different sides. FIG. 1G is an isometric view of the joint piece. FIG. 2G is an enlarged section showing the detail of the circled part of FIG. 2C.

As can be seen in each case, the joint piece consists of a base 1 of generally triangular shape in the case of FIG. 1 and circular shape in the case of FIG. 2. Extending from the side is a neck 2 at the end of which is a head 3. The base has a cavity 8 in it to save on material.

As shown in FIGS. 1 and 2, the exterior surface of the base has a set of ribs 4 with an angled frusto-conical face which enable the joint piece to be held firmly once push-fitted into a generally triangular or circular recess made in the edge of a panel. The left-most rib 4 (as seen in FIGS. 1C and 2C) is inset from the triangular or circular base of the joint piece to assist in ensuring the joint piece can be accurately aligned when it is to be pushed into the recess in the panel. As shown, the triangular shape of base 1 in FIG. 1 has rounded corners which enables the triangular-shaped recesses in the panels to be made using a simple cylindrical milling tool.

The keyhole shapes in other panels may be made using a milling tool having a cutting head of shape corresponding to the stud formed by neck 2 and head 3 on each of the joint pieces.

Figure 3:
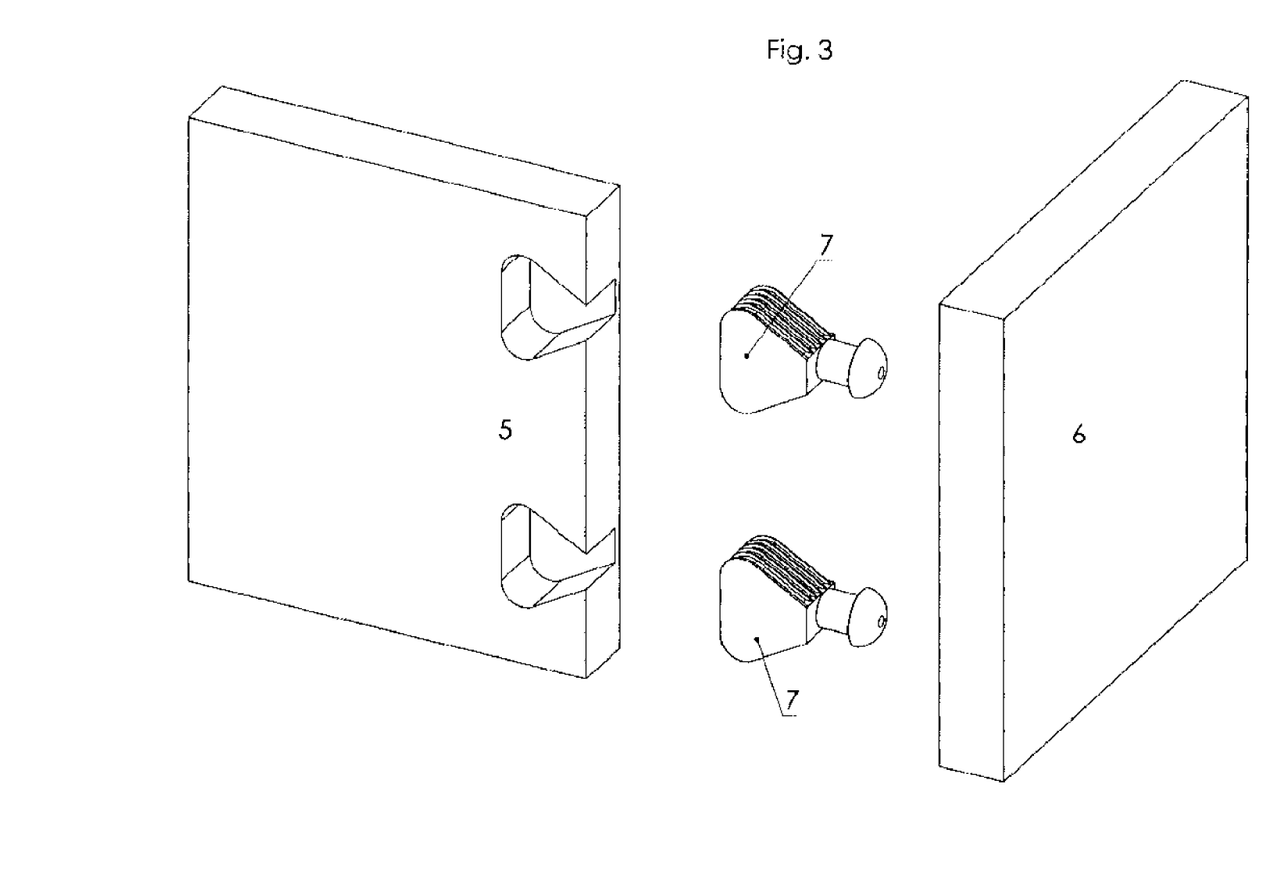
FIG. 3 is an exploded view of a corner structure showing a panel edge, two joint pieces and a second panel to be fixed to the first.
Figure 4:
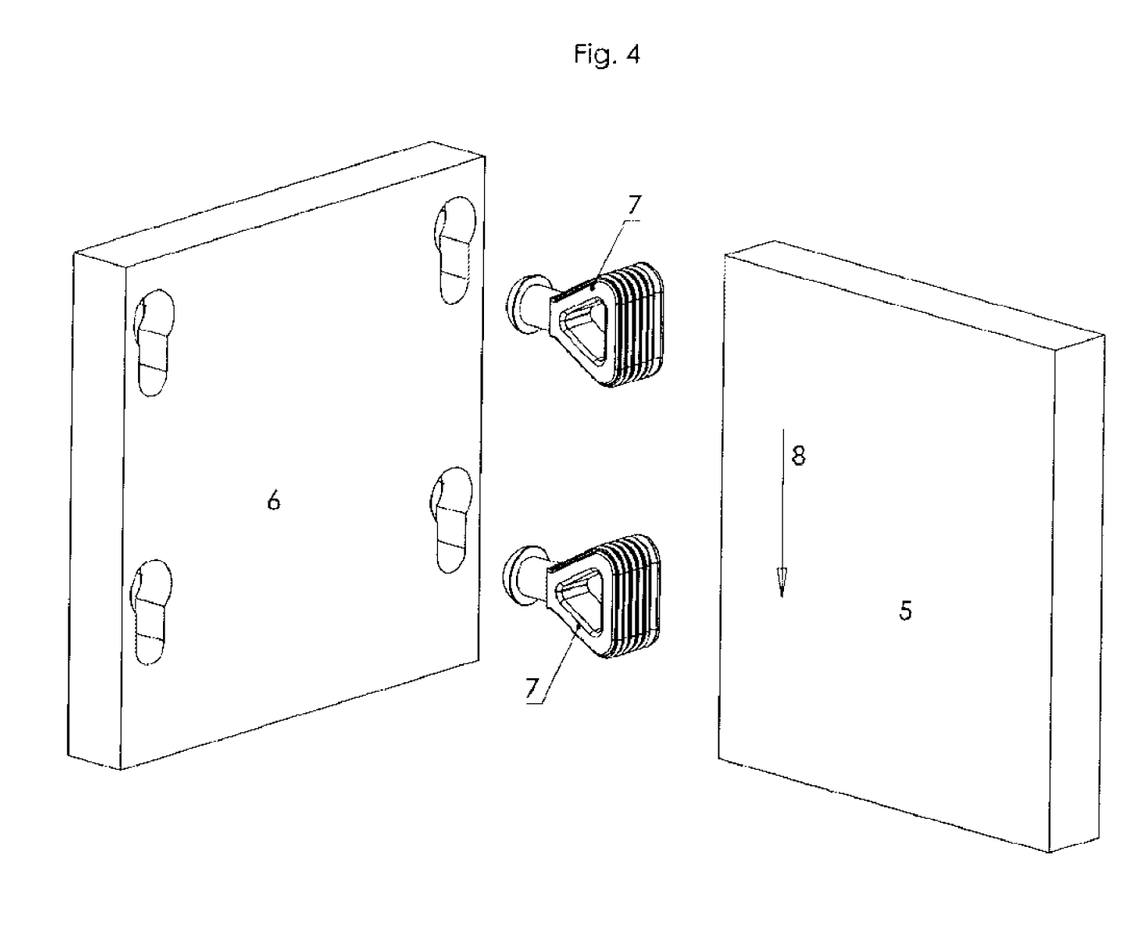
FIG. 4 shows the exploded view of FIG. 3 as viewed from the inside of the intended 90° joint corner formed by the assembled panels.

Referring now to FIGS. 3 and 4, the two panels to be joined are denoted 5 and 6. Panel 5 has two generally triangular recesses milled adjacent one edge while panel 6 has two keyhole-shaped slots milled adjacent another edge. The two joint pieces denoted 7 are first press-fitted into the triangular recesses shown in panel 5 and panel 6 is then located so that the two round parts of the two keyhole-shaped slots register with the protruding studs of the joint pieces 7, and the two panels are then brought together so that the end of panel 5 lies adjacent the face of panel 6. Panel 5 is then moved in a plane parallel to the plane of panel 6 in the direction of arrow 8 so as to cause the heads of the joint pieces to move along the narrower portions of the keyhole slots. The positioning of the keyhole-shaped slots and of the triangular recesses is such that when the heads of the joint pieces 7 reach the ends of the undercut slots in panel 6, the top and bottom edges (as seen in FIGS. 3 and 4) of the two panels 5 and 6 lie in the same plane.

Figure 5:
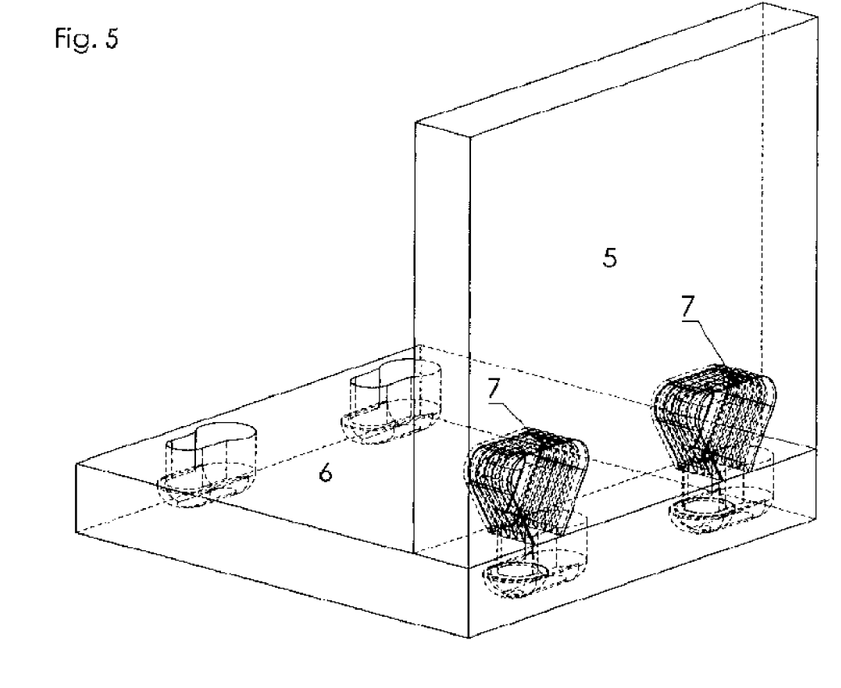
FIG. 5 is a diagrammatic view of the corner showing the two panels in full.
Figure 6A:
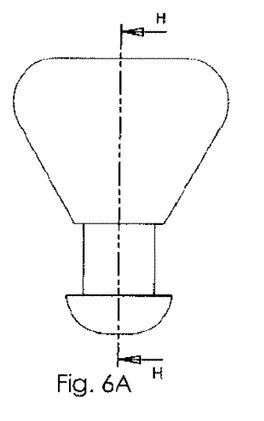
FIG. 6 (made up of sub-FIGS. 6A to 6G) shows a variant of the joint piece shown in FIG. 1.
Figure 6B:
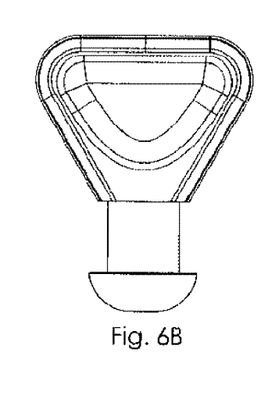
Figure 6C:
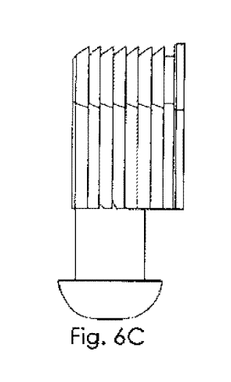
Figure 6D:
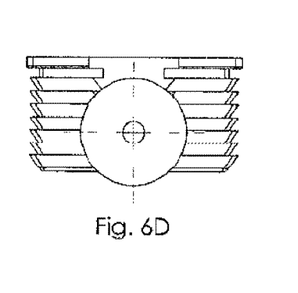
Figure 6E:
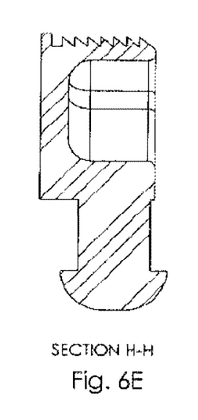
Figure 6F:
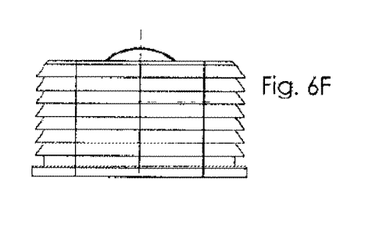
Figure 6G:
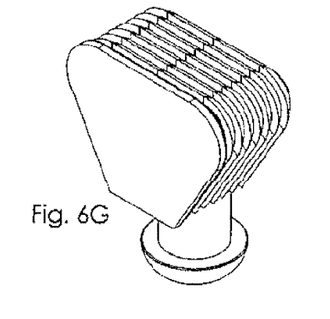
Figure 7A:
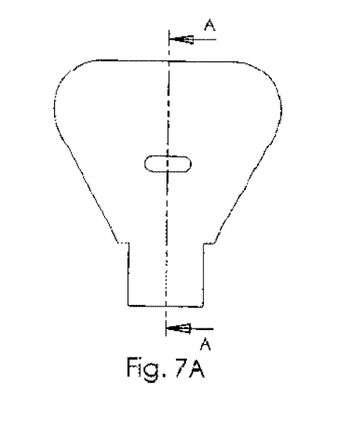
FIG. 7 (made up of sub-FIGS. 7A to 7F) shows a panel clip in various views.
Figure 7B:
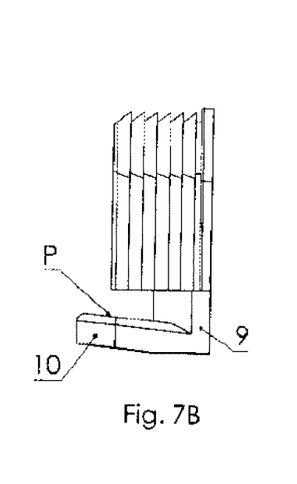
Figure 7C:
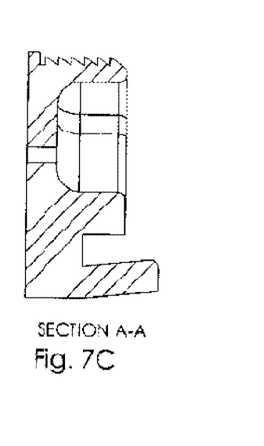
Figure 7D:
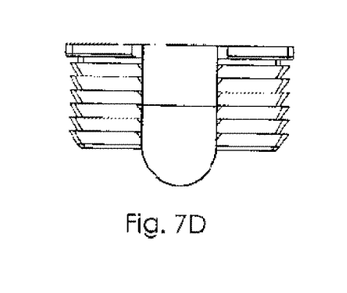
Figure 7E:
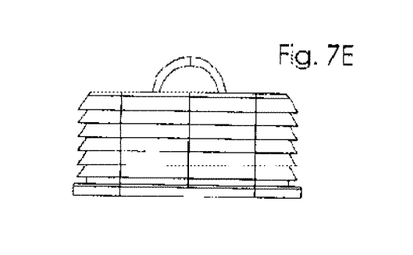
Figure 7F:
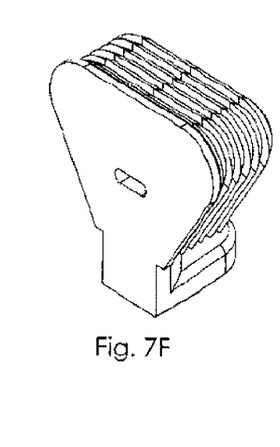
Figure 8A:
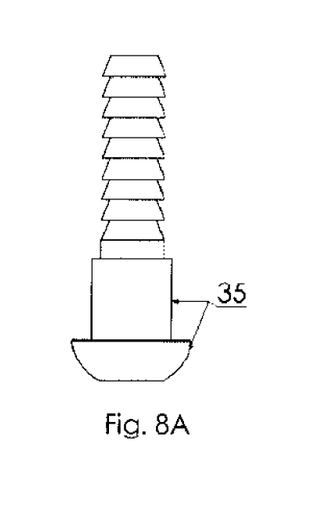
FIG. 8 shows in side view, side view at 90° to the first, section, end and perspective view, respectively FIGS. 8A to 8E, the structure of a headed stud which can be fixed to a panel and for engagement in an undercut keyhole slot in that panel.
Figure 8B:
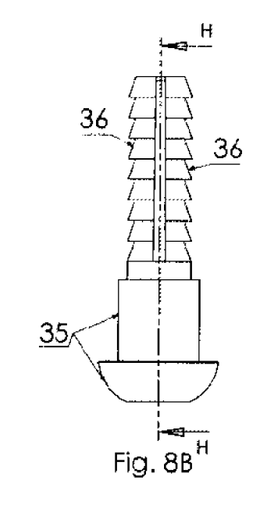
Figure 8C:
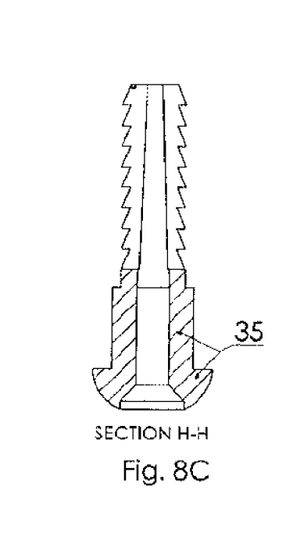
Figure 8D:
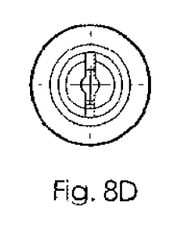
Figure 8E:
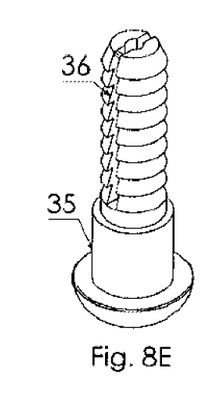
Figure 9A:
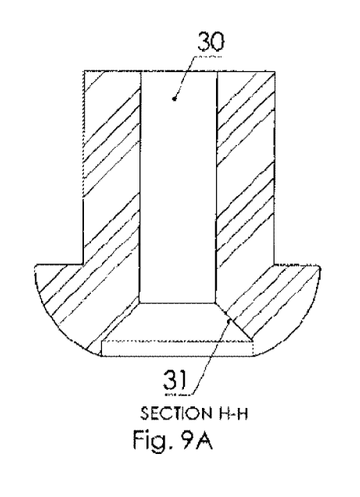
FIG. 9 shows a simpler form of headed stud, sub-FIGS. 9A to 9D showing it respectively in section, side view, end view and perspective view.
Figure 9B:
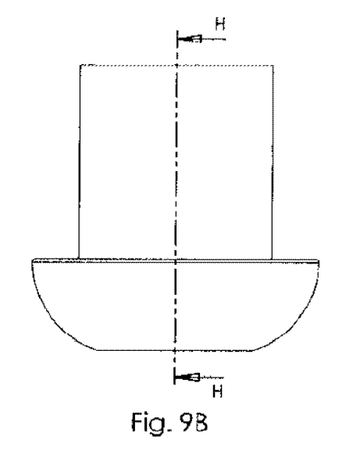
Figure 9C:
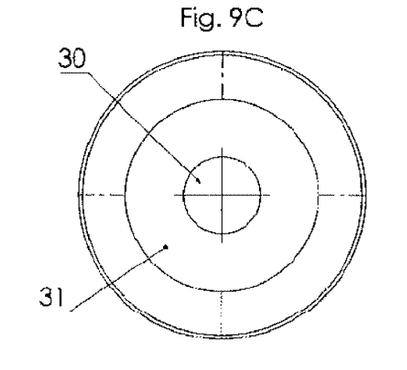
Figure 9D:
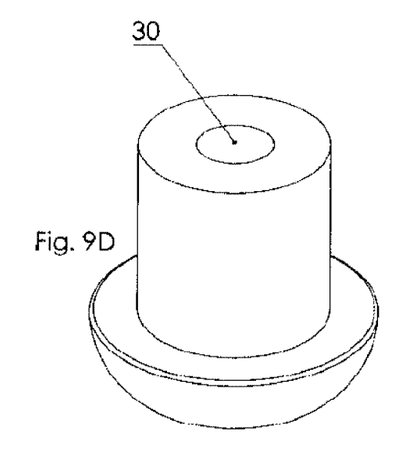
Figure 10A:
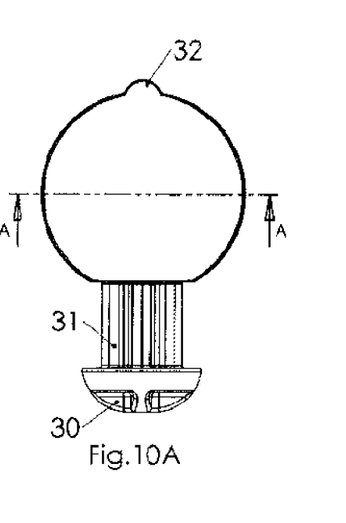
FIG. 10 shows a modified form of the joint piece shown in FIG. 2.
Figure 10B:
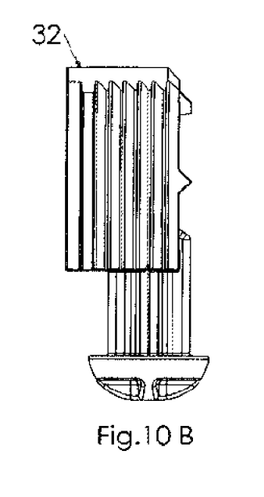
Figure 10C:
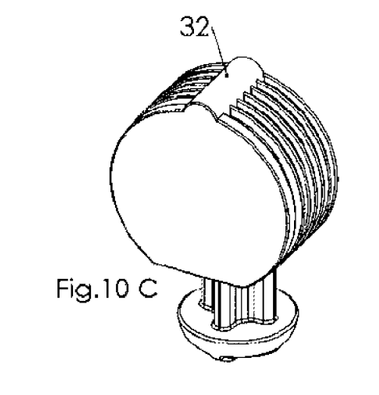
Figure 10D:
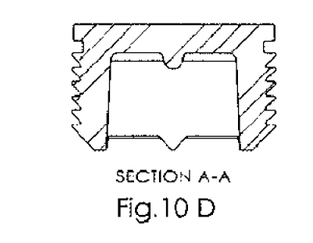
Figure 10E:
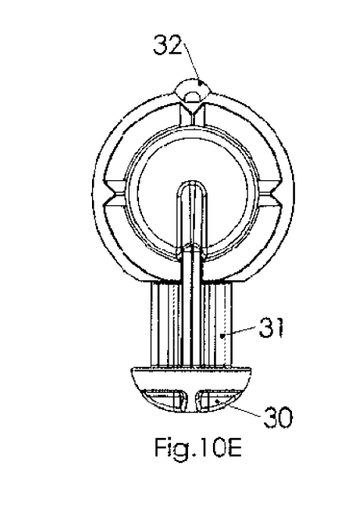
Figure 11A:
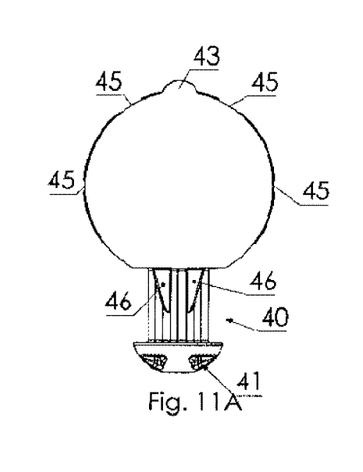
FIG. 11 (made up of sub-FIGS. 11A to 11F) shows a further form of joint piece according to the invention.
Figure 11B:
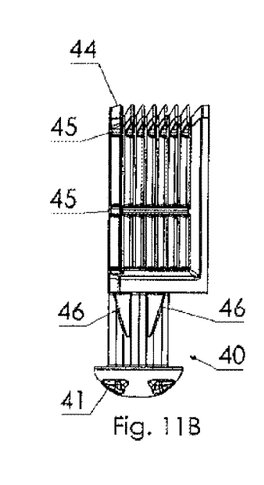
Figure 11C:
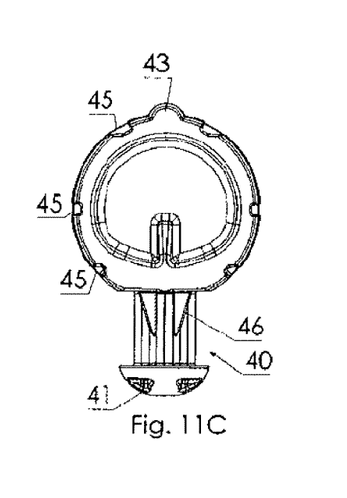
Figure 11D:
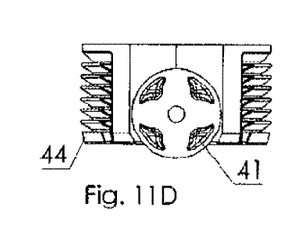
Figure 11E:
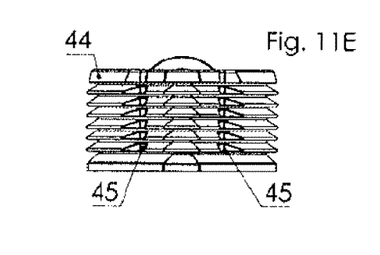
Figure 11F:
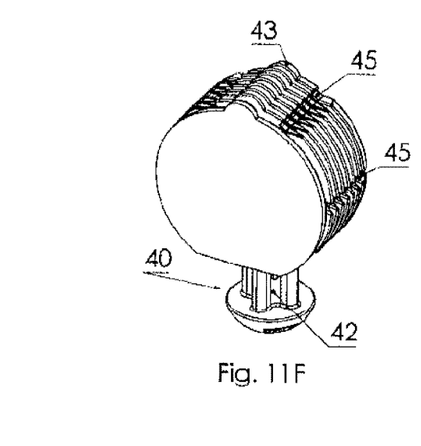
Figure 12A:
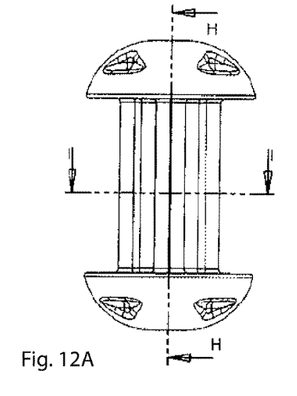
FIG. 12 (made up of sub-FIGS. 12A to 12E) shows a double-headed stud which may be used to attach two panels together.
Figure 12B:
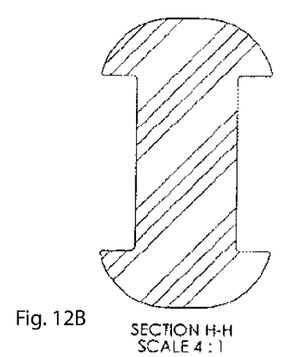
Figure 12C:
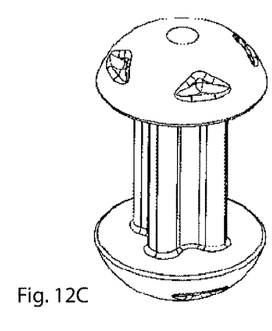
Figure 12D:
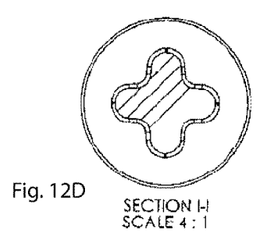
Figure 12E:
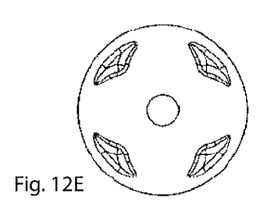

The final arrangement of the two panels and two joint pieces is shown diagrammatically in FIG. 5.

FIG. 6 shows a joint piece similar to that shown in FIG. 1, but with an alternative rib structure on the external generally prismatic base. It functions in the same way as the joint piece shown in FIG. 1.

In the clip piece shown in FIG. 7, the generally triangular base portion is similar to the base portion of the joint piece shown in FIG. 6, though of slightly lesser axial extent, but extending on the side of the prismatic base is a clip member consisting of a post extending in a direction perpendicular to the axis of the prismatic base and a tab denoted 10 running at a slight angle to the axis of the prismatic base so as to enable a thin panel to be supported at its edge with slight flexure of the post 9 so that the panel is gripped firmly. The panel is inserted in the direction of the arrow P shown in FIG. 7C.

If it is desired, in a furniture structure assembled using panels and joint pieces as described above and in accordance with the invention, to provide alternative undercut keyhole slots in one or more of the panels, this can be done with the object of receiving a headed stud, for example as shown in FIGS. 8 and 9. The stud shown in FIG. 9 of simple construction and intended to be mounted against the face of a panel. It has a central channel 30, the end of which is chamfered at 31 to receive the head of a standard wood screw.

The stud shown in FIG. 8 is used when it is desired to hold the stud in a pre-bored hole in a panel. Extending from a head portion 35 is a pair of legs 36 which together are adapted to be a press fit into a hole bored in the panel. The stud can be fixed in place by screwing a threaded screw through the head 35 and extending between the legs 36 to urge them firmly against the walls of the pre-bored hole.

FIG. 10 shows a developed form of the joint piece shown in FIG. 2, in which the configuration has been modified slightly to render the design more compatible with manufacture by injection-moulding.

In order to reduce the risk of distortion once the joint piece is extracted from the injection mould, as well as to reduce the amount of material used to make it, the head and sides of the stud are relieved, identified at 30 and 31 respectively on FIG. 10. Additionally, to assist fitting, a raised bead 32 is moulded on the side of the cylindrical section of the joint piece opposite the stud. A corresponding groove in the wall of the recess cut in the panel into which the joint piece is to be fitted may easily be provided using standard CNC milling techniques.

FIG. 11 shows a further developed form of the joint piece shown in FIG. 2. As can be seen, the joint piece has a stud portion 40 having its head and sides relieved at 41, 42 respectively for the same reasons as identified above with reference to FIG. 10. There is likewise a raised bead 43 on the side opposite the projecting stud to assist fitting into the cylindrical cavity formed in the panel with which the piece is to be used. In order to assist entry of the joint piece into the cavity in the panel, the edge 44 of the joint piece is chamfered. The ribs on the exterior surface of the base of the joint piece extend across the raised bead 43 and are themselves relieved by channels 45 which assist in enabling the sections of the ribs to flex as the joint piece is inserted into the preformed cavity in the panel.

Finally, the base of the stud portion 40 adjacent the body of the joint piece is reinforced by four wedge-shaped ribs 46.

FIG. 12 shows a double-headed stud, each end of which is of similar configuration to the stud portion of the joint piece shown in FIG. 10. The two heads are spaced apart by a distance which is double the distance from the side of a panel which has had an undercut keyhole shape formed in it and the surface of the undercut. These studs are used in order to fix two panels together, the two panels having keyhole-shaped undercut cavities in them of matching size, shape and positioning. The studs are first inserted into one of the panels and moved along to the end of the slot, whereafter the other panel is placed over the protruding studs, the heads of the protruding studs entering into the preformed keyhole-shaped configurations in the other panel, and the two panels, once they are touching, can then be slid one relative to the other to move the heads of the studs into the narrower end of the undercut keyhole shapes in the second panel. The two panels are accordingly fixed together, though they can be taken apart by sliding them relative to one another in the opposite sense.

The invention claimed is:

1. A joint structure comprising two panels joined together using one or more joint pieces, wherein:
   a first panel has, extending from a face of the panel, adjacent its edge, one or more recesses;
   a second panel is provided with one or more corresponding keyhole-shaped recesses;
   one or more joint pieces consisting of a circular or polygonal base having a generally cylindrical or prismatic structure having a longitudinal axis extending between a first terminal face and a second terminal face connected by a cylindrical or prismatic side surface and, protruding from a portion of said side surface of the base, a headed stud having a first narrower neck portion having a longitudinal axis adjacent the base and, at the end of the neck portion remote from the base, a wider head, where an edge of the head is offset from said portion of said side surface of the base and said neck portion is offset from the first terminal face of the base, and a sidewall surface of the neck portion is co-planar with the second terminal face, wherein the longitudinal axes of the base and headed stud extend perpendicular to one another,
   wherein said one or more recesses of the first panel has predetermined depth at least equal to the distance between the first and second terminal faces of the base of the joint piece and a shape corresponding to the circular or polygonal shape of the joint piece base,
   and wherein:
   the base of each of said one or more joint pieces is located in a corresponding recess of the first panel with the first terminal face facing outside the recess,
   the neck portion and head of the or each joint piece extends from an edge of the first panel and into a respective said keyhole-shaped recess in the second panel, where walls defining a narrower end of the keyhole shape in the second panel are undercut to provide a slot or seat into which the head of the stud forming part of the joint piece has been slid with the neck portion of the joint piece sliding along the narrower portion of the keyhole shaped slot.

2. The joint structure according to claim 1 where the length and position of the or each keyhole-shaped recess is such that when the joint is assembled with the stud(s) at the end(s) of the keyhole-shaped recess(es) the edges of the panels are aligned.

3. The joint structure according to claim 1 where the thickness of the panel material is such that the recesses into which the parts of the joint piece fit are blind.

4. A joint structure according to claim 1 wherein the base is of generally triangular dovetail shape.

5. A joint structure according to claim 1, wherein the side surface of the base bears a relief surface.

6. A joint structure according to claim 5, wherein the relief surface is in the form of a set of ribs having an angled frusto-conical shape.

7. A joint structure according to claim 5, wherein the relief surface is relieved by a plurality of grooves running parallel to the axis of the cylindrical or prismatic structure of the base.

8. A joint structure according to claim 1, wherein the head of the headed stud is a dome shape.

9. A joint structure according to claim 8, wherein the head of the stud is relieved by one or more dimples.

10. A joint structure according to claim 1, wherein the neck portion of the stud is of cruciform cross-section.

* * * * *